United States Patent
Bos et al.

(10) Patent No.: US 12,435,706 B2
(45) Date of Patent: Oct. 7, 2025

(54) SOLID-STATE ELECTROCHEMICAL COMPRESSOR

(71) Applicant: HYET HOLDING B.V., Arnhem (NL)

(72) Inventors: Albert Bos, Arnhem (NL); Adriaan Rombout Swanborn, Arnhem (NL)

(73) Assignee: HyET Holding B.V., Arnhem (NL)

(*) Notice: Subject to any disclaimer, the term of this patent is extended or adjusted under 35 U.S.C. 154(b) by 388 days.

(21) Appl. No.: 17/296,075

(22) PCT Filed: Nov. 21, 2019

(86) PCT No.: PCT/NL2019/050773
§ 371 (c)(1),
(2) Date: May 21, 2021

(87) PCT Pub. No.: WO2020/106154
PCT Pub. Date: May 28, 2020

(65) Prior Publication Data
US 2022/0010785 A1    Jan. 13, 2022

(30) Foreign Application Priority Data
Nov. 23, 2018   (NL) ...................................... 2022069

(51) Int. Cl.
*F03G 7/00*    (2006.01)
*C25B 1/04*    (2021.01)
(Continued)

(52) U.S. Cl.
CPC .................. *F03G 7/00* (2013.01); *C25B 1/04* (2013.01); *C25B 9/23* (2021.01); *C25B 9/60* (2021.01)

(58) Field of Classification Search
CPC .... F03G 7/00; C25B 9/05; C25B 9/23; C25B 1/04; C25B 9/70; Y02E 60/36; Y02E 60/50; H01M 2008/1095
See application file for complete search history.

(56) References Cited

U.S. PATENT DOCUMENTS

| | | | |
|---|---|---|---|
| 5,187,025 A | 2/1993 | Kelland et al. | |
| 2003/0003342 A1* | 1/2003 | Sugita ................ | H01M 8/1004 429/481 |

(Continued)

FOREIGN PATENT DOCUMENTS

| | | | | |
|---|---|---|---|---|
| CN | 102237529 A | * | 11/2011 | ............. C23C 30/00 |
| CN | 105951118 B | | 9/2018 | |

(Continued)

OTHER PUBLICATIONS

Bae, S.W., Baral, A., Sinha Mahapatra, P.R. (2019). Maximum-Width Empty Square and Rectangular Annulus. In: Das, G., Mandal, P., Mukhopadhyaya, K., Nakano, Si. (eds) WALCOM: Algorithms and Computation. WALCOM 2019. Springer, Cham. https://doi.org/10.1007/978-3-030-10564-8_6 (Year: 2018).*

*Primary Examiner* — Dominick L Plakkoottam
(74) *Attorney, Agent, or Firm* — The Webb Law Firm

(57) ABSTRACT

Provided is an example solid state hydrogen compressor, including at least one membrane fixed between two porous electrodes, together forming a membrane electrode assembly. The membrane electrode assembly is clamped between a pair of cell plates. The membrane has a larger area than the porous electrodes and protrudes outside an area of the porous electrodes. The cell plates have a larger area than the membrane and protrude outside an area of the membrane. The compressor includes two insulating gaskets each surrounding one of the porous electrodes covering the part of the membrane that protrudes outside the region of the electrodes and protruding outside the area of the membrane. The compressor further includes a reinforcement layer, arranged between the insulating gaskets, outside the area of the electrodes.

10 Claims, 2 Drawing Sheets

(51) Int. Cl.
*C25B 9/23* (2021.01)
*C25B 9/60* (2021.01)

(56) References Cited

U.S. PATENT DOCUMENTS

| | | | | |
|---|---|---|---|---|
| 2005/0255362 | A1* | 11/2005 | Miyazawa | H01M 8/0247 |
| | | | | 429/480 |
| 2006/0046121 | A1* | 3/2006 | Shimohira | H01M 8/0289 |
| | | | | 429/534 |
| 2006/0073373 | A1* | 4/2006 | Andrin | H01M 8/0271 |
| | | | | 429/510 |
| 2006/0121330 | A1* | 6/2006 | Reijerse | H01M 8/0206 |
| | | | | 72/379.6 |
| 2006/0166066 | A1* | 7/2006 | Nishimura | H01M 8/026 |
| | | | | 429/534 |
| 2007/0190400 | A1* | 8/2007 | Buche | H01M 8/0234 |
| | | | | 429/510 |
| 2010/0248087 | A1* | 9/2010 | Tsuji | H01M 8/1004 |
| | | | | 429/535 |
| 2011/0081591 | A1 | 4/2011 | Scherer et al. | |
| 2011/0089029 | A1* | 4/2011 | Volk, Jr. | C25B 11/00 |
| | | | | 204/276 |
| 2011/0147202 | A1* | 6/2011 | Haryu | C25B 9/73 |
| | | | | 204/257 |
| 2012/0129079 | A1 | 5/2012 | Middelman | |
| 2012/0217156 | A1* | 8/2012 | Nakazawa | C25B 9/23 |
| | | | | 204/258 |
| 2013/0108942 | A1* | 5/2013 | Sugiura | H01M 4/8605 |
| | | | | 429/480 |
| 2016/0116381 | A1* | 4/2016 | Haupt | B01L 3/5029 |
| | | | | 73/864 |
| 2017/0317373 | A1* | 11/2017 | Stahl | H01M 8/0273 |
| 2019/0218671 | A1* | 7/2019 | Yamamoto | C25B 9/05 |

FOREIGN PATENT DOCUMENTS

| | | |
|---|---|---|
| EP | 1624515 A1 | 8/2006 |
| JP | 2006185613 A | 7/2006 |
| JP | 2008071542 A | 3/2008 |
| JP | 2008123957 A | 5/2008 |
| JP | 2012134094 A | 7/2012 |
| WO | 2007113592 A1 | 10/2007 |
| WO | 2010092175 A1 | 8/2010 |

\* cited by examiner

SOLID-STATE ELECTROCHEMICAL COMPRESSOR

CROSS-REFERENCE TO RELATED APPLICATIONS

This application is the United States national phase of International Application No. PCT/NL2019/050773 filed Nov. 21, 2019, and claims priority to The Netherlands Patent Application No. 2022069 filed Nov. 23, 2018, the disclosures of which are hereby incorporated by reference in their entirety.

BACKGROUND OF THE INVENTION

Field of the Invention

The present invention relates to a solid state compressor, in particular a solid state hydrogen compressor, and more in particular to the sealing of such compressor.

Description of Related Art

The core of a solid-state hydrogen compressor is a membrane which is normally fixed between two porous electrodes, together forming a membrane electrode assembly (MEA). The electrodes are porous to allow gases and fluids to pass to and from the membrane, and electrically conductive to allow a current to be affected.

The membrane electrode assemblies are fixed between cell plates (also called so-called bipolar plates) which are complex structures that have multiple functions: they mechanically support the membrane electrode assemblies, allow current to pass through and supply and divert gases and water to and from the membrane electrode assembly. The combination of membrane electrode assembly and surrounding bi-polar or cell plates is usually called a cell.

A solid-state compressor is normally composed of multiple cells to achieve enough capacity (total membrane surface area). To be cost effective and to allow current to be passed through the cells without wiring, the cells are stacked in series and clamped between end flanges. This is well known from the field of fuel cell stacks, which are stacked in a similar manner and for the same purpose.

Contrary to fuel cell stacks which are normally operated at a few bars pressure, in the case of a hydrogen compressor, the end flanges and cell plates need to provide sufficient mechanical strength and stability to contain the operating pressures of the compressed gas which can exceed 1000 bar.

In fuel cell stacks the membrane electrode assemblies are clamped between the bi-polar plates and have a non-conducting edge (the border/gasket) which prevents current from passing directly from electrode to electrode around the membrane electrode assembly (an electrical short circuit) and often also provide a mechanism of sealing at the same time. Sometimes the sealing function is provided by other parts such as gaskets.

In the case of high-pressure solid-state compression stacks the same insulation and sealing functions need to be performed as with fuel cells. Both functions can be conveniently performed by employing an insulating polymer (film). The polymer (film) can either 'wedge' the membrane of the membrane electrode assembly, or else be employed on one or both sides of the membrane and forming an insulating 'gasket'.

By exerting a mechanical (vertical) pressure on this border polymer, the sealing can be accomplished and a mechanical pressure higher than the compression pressure is applied.

In some cases this may be in excess of 700 bar or 1000 bar. However, at these very high sealing pressures the polymer and/or polymer and the membrane may be plastically deformed and forced either out from between the bi-polar plates or into orifices needed for passing through gasses and or liquids to the membrane electrode assembly, or the orifices of the cooling fluids.

The amount of deformation depends on the characteristics of the polymeric materials and their thicknesses. The thicker the layers and the more plastically deformable, the easier it becomes for the materials to 'flow'. In any sub-volume of a polymer the molecular chains have some degree of freedom to move or stretch. The thinner a polymer sheet is, the less this flexibility allows the core part of the polymer sheet to move/deform laterally.

Another way to provide enough sealing with tolerable lateral deformation is to make the border very wide. This increases the ratio of the lateral part of the polymer to its thickness, however, this increases the cost and size of the peripheral structures.

SUMMARY OF THE INVENTION

It is a goal of the present invention to take away the disadvantages of the prior art solid state compressors, or at least to provide a useful alternative. The invention thereto proposes a solid state hydrogen compressor, comprising at least one membrane fixed between two porous electrodes, together forming a membrane electrode assembly, a pair of cell plates or bipolar plates, between which the membrane electrode assembly is clamped, wherein the membrane has a larger area than the porous electrodes and protrudes outside an area of the porous electrodes; and the cell plates have a larger area than the membrane and protrude outside an area of the membrane, two insulating gaskets, each surrounding one of the porous electrodes, covering the part of the membrane that protrudes outside the region of the electrodes; and protruding outside the area of the membrane, and a reinforcement layer, arranged between the insulating gaskets, outside the area of the electrodes.

The reinforcement layer may be a high pressure sealing, which is a sealing that is capable of withstanding a pressure up to 50-1000 bar, which provides insulation and also results in borders of manageable size.

The reinforcement layer may for instance surround the membrane, and thus be located at the place where the gaskets extend beyond the surface of the membrane.

Preferably the reinforcement layer fills the area between the insulating gaskets around the membrane. An even distribution of the forces exerted on the gasket and the reinforcement layer is herewith obtained.

The reinforcement layer may be made of an insulating material such as Kevlar® (e.g., aramid fibre), which has the advantage that the risk of an electric shortcut is reduced, but it may also be metal layer, which may be beneficial because of its high strength.

In general, the solid state hydrogen compressor according to the present invention may have a round cross section, wherein the membrane, the electrodes and the cell plates all have round cross sections and the gaskets and the reinforcement layer have ring shaped cross sections. This leads to a robust construction.

The reinforcement layer may be within the region of the bipolar plates. So it may be kept just as small as necessary, not extending outside the stack forming the hydrogen compressor. For an optimal insolation, the gasket may extend beyond the membrane on either side of said membrane in the direction facing away from the porous electrodes.

The gasket may be made from a polymer, which may a regular polymer used in hydrogen compressor according to the state of the art, be it that the reinforcement layer allows the gasket to be thinner, and thus have a smaller risk of deformation.

Alternatively, multiple reinforcement parts may be applied, in particular surrounding channels in the solid state hydrogen compressor. These channels may be for coolant or for a gas to be compressed, such as hydrogen.

A reinforcing structure may also be embedded in the polymer border material, most conveniently by laminating. Preferably here also a metal reinforcement may be used, but other reinforcing materials such as Kevlar® (e.g., aramid fibre) etc. may be used.

This reinforcing structure prevents the outward deformation of the polymer by allowing thinner polymer layers that can withstand more lateral shear force.

Ideally this structure is of a suitable thickness and in combination with the polymer film make the border of a thickness in the same range of the membrane electrode assembly itself so that flat bi-polar plates can be used.

The thickness of the reinforcement may be between 1 and 200 um, while the thickness of the bipolar plates may be between 200 and 5000 um.

As the reinforcing structure is insulated between the polymer sheets, it may be of a conducting material as the polymer provides the insulating feature, but an insulator may be applied too, and even be preferred.

Alternatively, for intermediate pressure systems, if the membrane itself forms part of the border, smaller reinforcing structures may be embedded around the smaller orifices to prevent membrane and/or polymer to deform into the orifices.

BRIEF DESCRIPTION OF THE DRAWINGS

The invention will now be elucidated into more detail, with reference to the following figures, wherein.

DESCRIPTION OF THE INVENTION

Figure 1:
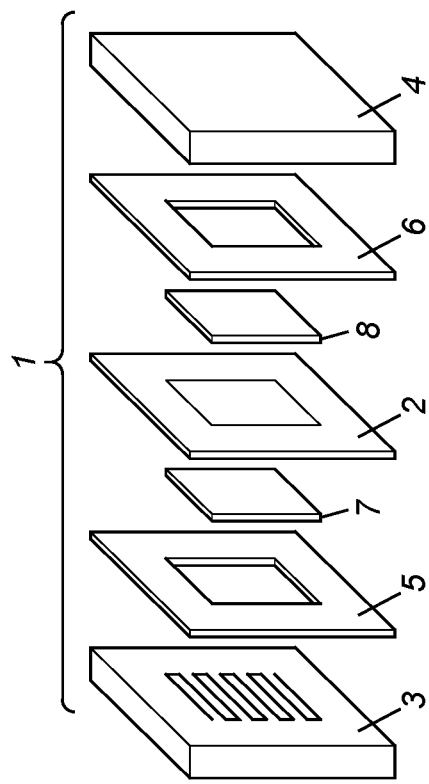
FIG. 1 shows a fuel cell according to the state of the art.

FIG. 1 shows a fuel cell according to the state of the art. The cell comprises a membrane 2, clamped in between electrodes 3, 4, formed by graphite blocks. In between the membrane and the respective electrodes, gas diffusion backings 7, 8 are present, with a smaller area than the area of the membrane 2 and the electrodes 3, 4. The diffusion backings are surrounded by Teflon masks 5, 6.

Figure 2:
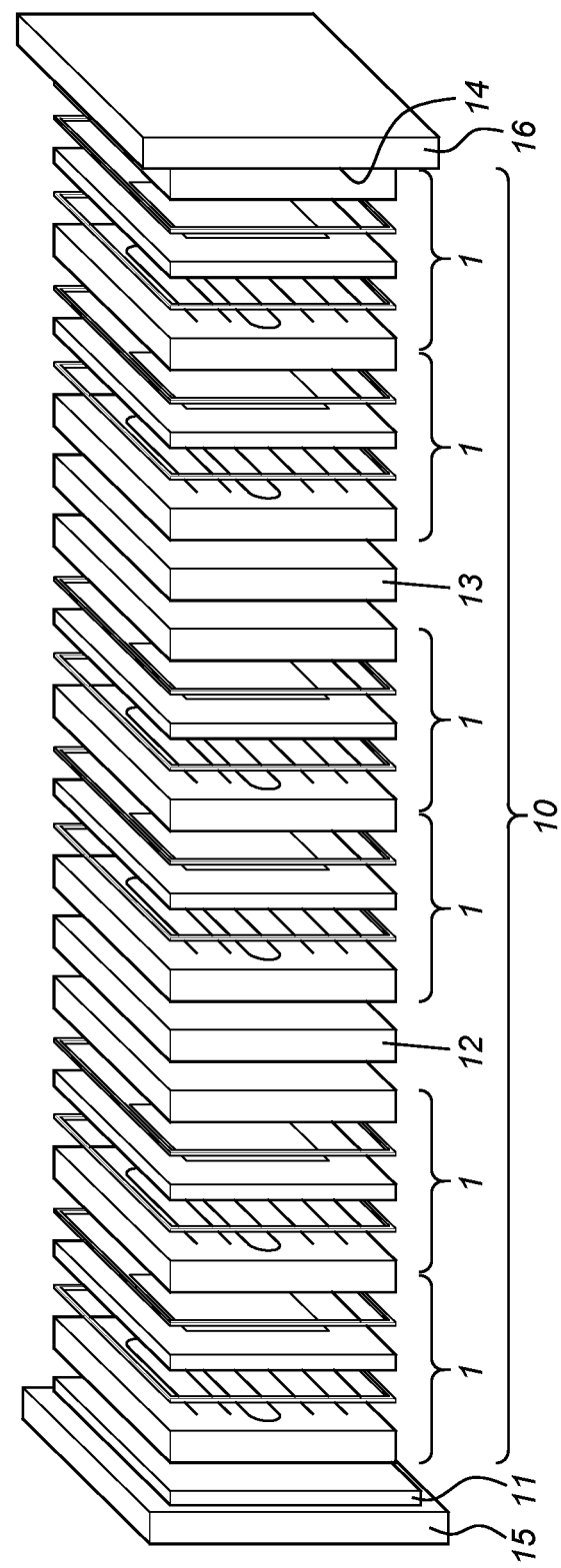
FIG. 2 shows a stack of fuel cells according to the state of the art.

FIG. 2 shows a stack 10 of multiple fuel cells 1 according to the state of the art. The stack 10 comprises multiple fuel cells 1 as shown on FIG. 1, separated by cooling plates 11, 12, 13, 14. The fuel cells are clamped in between end plates 15 and 16.

Figure 3A:
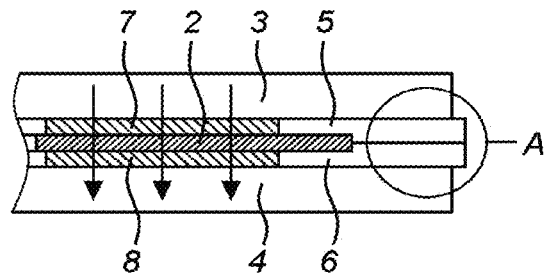
FIG. 3a shows a detail of a first embodiment of a stack of fuel cells according to the state of the art.

FIG. 3a shows a detail in a first embodiment of a fuel cell 1 from FIG. 1 in a stack of fuel cells, as shown in FIG. 2. In the figure it is visible that the membrane 2 extends beyond the electrodes 7, 8. Where it extends, it is clamped in between gaskets 5, 6. The gaskets are larger than the area over which the membrane 2 extends beyond electrodes 7, 8 and engage each other outside the membrane area. This is indicated with region A.

Figure 3B:
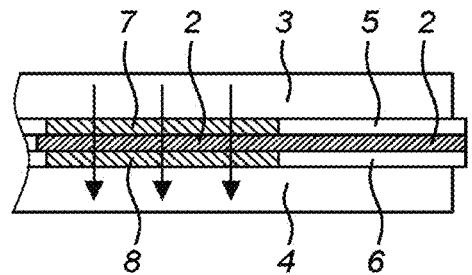
FIG. 3b shows a detail of a second embodiment of a stack of fuel cells according to the state of the art.

FIG. 3b shows a detail in a second embodiment of a fuel cell 1 from FIG. 1 in a stack of fuel cells 10, as shown in FIG. 2. In the figure it is visible that the membrane 2 extends beyond the electrodes 7, 8. Where it extends, it is clamped in between Teflon masks 5, 6.

The gaskets are just as large as the area over which the membrane 2 extends beyond electrodes 7, 8 and do in this embodiment not engage each other outside the membrane area. This is indicated with region A.

Figure 4A:
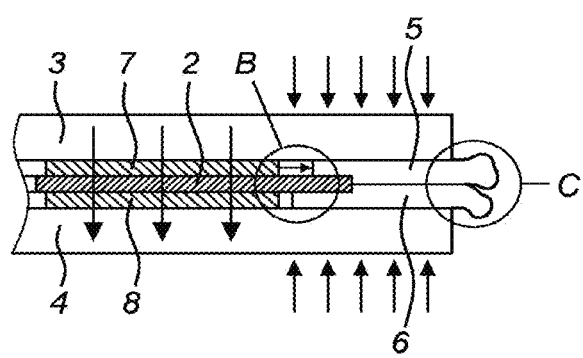
FIG. 4a shows a first detail of a problem associated with the state of the art.

FIG. 4a shows a problem associated with the a fuel cell 1 according to the state of the art, in a stack of fuel cells 10 as shown in FIG. 3a, once a mechanical sealing pressure is applied on the cell stack 10. It is visible in the region indicated with B that the gaskets 5 and 6 have shifted in a direction perpendicular to the sealing pressure, both with a different amount. The region indicated with C shows the effect, both masks are pressed out of the stack, also to a different extend.

Figure 4B:
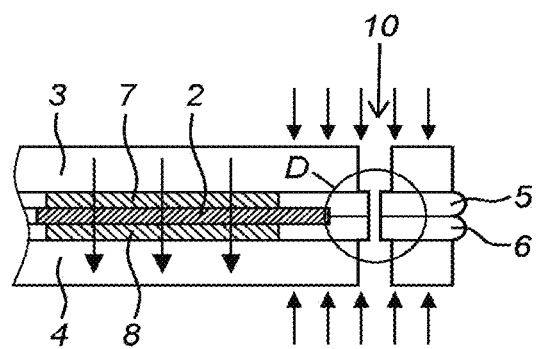
FIG. 4b shows a second detail of a problem associated with the state of the art.

FIG. 4b shows a second detail of a problem associated with the state of the art, when gaskets 5, 6 are in the vicinity D of a through hole 10 through the cell plates 3, 4, for coolant or for hydrogen for instance. The force for assembling the compressor forces the gaskets 5, 6 into the through hole 10, which may then be unintendedly be blocked or partly be blocked.

Figure 5A:
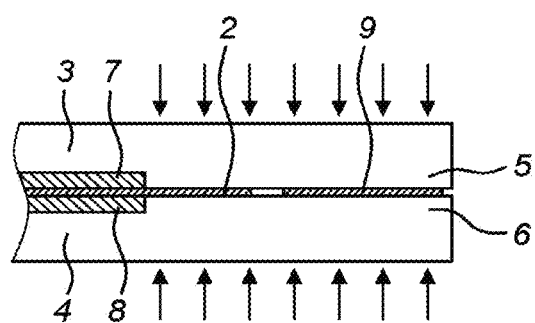
FIGS. 5a and 5b show details of the present invention.

FIG. 5a shows a detail of the present invention. As can be seen in the figure, the membrane 2 extends outside the electrode 7 and 8. Where the membrane extends outside the electrodes, gaskets 5 and 6 are placed between the cell plates 3, 4 and the membrane 2. Where the membrane stops, a reinforcement 9 is placed between the gaskets 5 and 6. The reinforcement 9 has a comparable thickness to that of the compressed membrane 2, while the gaskets 5 and 6 have comparable thicknesses as the electrodes. As a result, the gaskets remain at their intended locations.

Figure 5B:
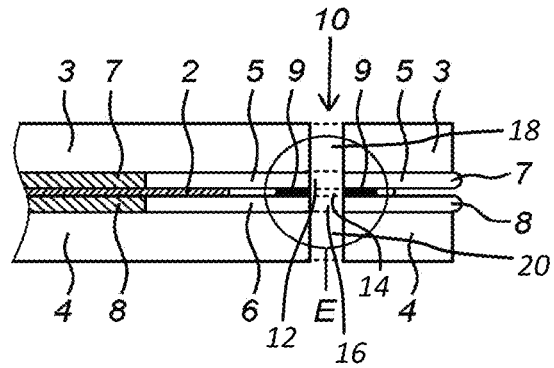

FIG. 5b shows a similar configuration, with a plurality of through holes 10, 12, 14, 16, 18, 20 at location E. Around the through hole a small reinforcement 9 is applied, with a corresponding hole 14, to avoid the gaskets 5 and 6 to be pressed into the plurality of through holes 10, 12, 16, 18, 20. In a configuration like this, several reinforcements may be applied.

The examples given are exemplary only and do in no way limit the scope of the present invention, as defined in the following claims.

The invention claimed is:

1. A solid state hydrogen compressor, comprising:
   at least one membrane fixed between two porous electrodes, together forming a membrane electrode assembly;
   a pair of cell plates or bipolar plates, between which the membrane electrode assembly is clamped;

wherein the membrane has a larger area than the porous electrodes and protrudes outside an area of the porous electrodes; and
wherein the cell plates have a larger area than the membrane and protrude outside an area of the membrane;
two insulating gaskets,
each surrounding one of the porous electrodes;
covering the part of the membrane that protrudes outside the region of the electrodes; and
protruding outside the area of the membrane;
wherein a single reinforcement layer is arranged between the insulating gaskets, completely radially outside a radial edge of each electrode;
wherein the reinforcement layer has a first thickness;
wherein the insulating gaskets have a second thickness;
wherein the insulating gaskets are formed as annular rings;
wherein each respective insulating gasket comprises a first through hole passing through the center of the respective insulating gasket to form a respective annular ring;
wherein each respective insulating gasket comprises a second through hole radially outside the first through hole and arranged in the material forming the annular ring of the respective insulating gasket;
wherein the second through hole of each respective insulating gasket is concentric with through holes formed in each cell plate for the passage of coolant;
wherein the solid state hydrogen compressor comprises a round cross section;
wherein the membrane, the electrodes, and the cell plates each comprise a round cross section and the insulating gaskets and the reinforcement layer each comprise a ring shaped cross section;
wherein the insulating gaskets extend beyond the membrane on either side of the membrane in the direction facing away from the porous electrodes; and wherein the single reinforcement layer directly abuts both the insulating gaskets.

2. The solid state hydrogen compressor according to claim 1, wherein the reinforcement layer surrounds the membrane.

3. The solid state hydrogen compressor according to claim 1, wherein the reinforcement layer fills the area between the insulating gaskets around the membrane.

4. The solid state hydrogen compressor according to claim 1, wherein the reinforcement layer is a metal layer.

5. The solid state hydrogen compressor according to claim 1, wherein the two insulating gaskets are made from a polymer.

6. The solid state hydrogen compressor according to claim 1, wherein the two insulating gaskets are made from an insulating material.

7. The solid state hydrogen compressor according to claim 1, wherein the reinforcement layer is within the region of the bipolar plates.

8. The solid state hydrogen compressor according to claim 1, wherein the reinforcement layer is a high pressure sealing, capable of withstanding a pressure up to 1000 bar.

9. A solid state hydrogen compressor, comprising:
at least one membrane fixed between two porous electrodes, together forming a membrane electrode assembly;
a pair of cell plates or bipolar plates, between which the membrane electrode assembly is clamped;
wherein the membrane has a larger area than the porous electrodes and protrudes outside an area of the porous electrodes; and
wherein the cell plates have a larger area than the membrane and protrude outside an area of the membrane;
two insulating gaskets,
each surrounding one of the porous electrodes;
covering the part of the membrane that protrudes outside the region of the electrodes; and
protruding outside the area of the membrane;
herein a single reinforcement layer is arranged between the insulating gaskets, completely radially outside a radial edge of each electrode;
wherein the reinforcement layer has a first thickness;
wherein the insulating gaskets have a second thickness;
wherein the insulating gaskets are formed as annular rings;
wherein each respective insulating gasket comprises a first through hole passing through the center of the respective insulating gasket to form a respective annular ring;
wherein each respective insulating gasket comprises a second through hole radially outside the first through hole and arranged in the material forming the annular ring of the respective insulating gasket;
wherein the reinforcement layer comprises a third through hole;
wherein the second through hole of each respective insulating gasket is concentric with through holes formed in each cell plate for the passage of coolant and concentric with the third through hole of the reinforcement layer;
wherein the reinforcement layer is configured to prevent the two insulating gaskets from being pressed into the through holes formed in each cell plate; and wherein the single reinforcement layer directly abuts both the insulating gaskets.

10. A solid state hydrogen compressor, comprising:
at least one membrane fixed between two porous electrodes, together forming a membrane electrode assembly;
a pair of cell plates or bipolar plates, between which the membrane electrode assembly is clamped;
wherein the membrane has a larger area than the porous electrodes and protrudes outside an area of the porous electrodes; and
wherein the cell plates have a larger area than the membrane and protrude outside an area of the membrane;
two insulating gaskets,
each surrounding one of the porous electrodes;
covering the part of the membrane that protrudes outside the region of the electrodes; and
protruding outside the area of the membrane;
wherein a single reinforcement layer is arranged between the insulating gaskets, completely radially outside a radial edge of each electrode;
wherein the reinforcement layer has a first thickness; wherein the insulating gaskets have a second thickness; and wherein the single reinforcement layer directly abuts both the insulating gaskets.

* * * * *

UNITED STATES PATENT AND TRADEMARK OFFICE
CERTIFICATE OF CORRECTION

PATENT NO. : 12,435,706 B2  
APPLICATION NO. : 17/296075  
DATED : October 7, 2025  
INVENTOR(S) : Albert Bos et al.

Page 1 of 1

It is certified that error appears in the above-identified patent and that said Letters Patent is hereby corrected as shown below:

In the Claims

Column 6, Line 15, Claim 9, delete "herein" and insert -- wherein --

Signed and Sealed this  
Second Day of December, 2025

John A. Squires  
*Director of the United States Patent and Trademark Office*